L. BELL.
OPHTHALMIC LENS.
APPLICATION FILED JUNE 25, 1917.

1,253,998.

Patented Jan. 15, 1918.

Inventor
Louis Bell
By
Attorney

UNITED STATES PATENT OFFICE.

LOUIS BELL, OF NEWTON, MASSACHUSETTS, ASSIGNOR OF ONE-HALF TO HIMSELF AND ONE-HALF TO WALTER G. WOLFE, OF WAKEFIELD, MASSACHUSETTS.

OPHTHALMIC LENS.

1,253,998.   Specification of Letters Patent.   Patented Jan. 15, 1918.

Application filed June 25, 1917. Serial No. 176,701.

*To all whom it may concern:*

Be it known that I, LOUIS BELL, a citizen of the United States, residing at Newton, county of Middlesex, Commonwealth of Massachusetts, have invented certain new and useful Improvements in Ophthalmic Lenses, of which the following is a specification.

This invention relates to an improved form of ophthalmic lenses designed to facilitate the correction of the errors of refraction of the human eye by a novel distribution of the refractive surfaces applied to this purpose.

The general principle of all correction of errors of refraction by means of glasses is to oppose to the errors of refraction found in the eye, equal and opposite refractions in the compensating lens, so as nearly as possible to obtain a resultant refraction free from aberrations and so proportioned as to bring the entering rays of light to an accurate focus on the retina within the easily available range of accommodation.

Where the refractive errors of the eye are symmetrical about its optic axis the conditions are approximately met by one or more spherical surfaces giving the necessary change of refraction. When the errors are not symmetrical about an axis it becomes necessary to use correcting lenses which are themselves unsymmetrical and so proportioned as to compensate the asymmetry of refraction in the eye.

To this end it has been customary to provide in combination spherical and cylindrical refractive surfaces with axes adjusted to meet the required conditions. A further step has been to employ cylindrical surfaces with radii and axes suitably chosen, or to develop crossed cylinders into surfaces generally of toroidal form in which a refracting surface has two radii of curvature of the same sign, but of different absolute values along two axes, generally at right angles.

The toroidal surface thus generated may be likened to a small section sliced from a bicycle tire perpendicular to a radius from the center of the wheel, which surface displays two radii of curvature at right angles, generating a composite curve. In such forms of ophthalmic lens the surface has homologous refractive effect along both axes, that is, both curvatures are either convex or concave.

This correlation is sometimes unobjectionable, but may lead to an inconvenient form of lens, of objectionable bulk and weight, particularly when large or complicated errors or refraction have to be compensated. In such cases the requirement that the two radii of the composite curve shall have the same sign is a burdensome one.

In my improved lens I have provided a means of dealing far more freely with the necessary corrections by means of uniting in a single surface both plus and minus curvatures, leaving therefore one free surface on the lens to which can be applied other curvatures carrying out a still further approximation to the correction of the total errors of refraction. When the sum of these is great my construction is particularly important in enabling them to be made without undue thickness and consequent weight of the glass in the spectacle lens, as, for instance, in cases involving astigmatism with considerable myopia or corneal astigmatism after removal of the crystalline lens for cataract.

My lens structure is also of practical importance in that it makes possible a very considerable reduction in the number of stock lens combinations which the optician has heretofore been required to carry in stock in order to make prescriptions promptly. It will be seen that by a comparatively few stock lenses of plano-endo-toroidal form it is possible for the optician by a neutralizing or augmenting or grinding of the plane face to vary the optical resultant form originally obtained from the stock lenses.

The form of the surface in my improved lens is not analogous to that of an ordinary toroidal form owing to the difference of sign as between the radii. If one conceives of the ordinary toroidal lens as a bit cut from the surface of a bicycle tire as hereinbefore indicated, then the composite curvature of my improved lens may be regarded as endotoroidal such as would be observed in looking through the aperture formed by removal of the just mentioned toroid, or diametrically across the tire to its farther side.

Such endotoroidal forms may or may not have their axes at right angles and they may be produced in using as a base either a plane blank of glass or a blank in perisconic form embraced by a section between two concentric spherical surfaces. In any case, however, the refracting curves in the respective axes are of opposite effect, one being plus and the other minus.

Figure 1 of the drawing is a plan view of a lens having such an endotoroidal surface produced on a plane base and having indicated on it the respective axes of curvature.

My lens in the form shown comprises an element formed with a face 1 which may be flat or otherwise and an opposite curved surface or face 2. This face 2 is of peculiar and novel curvature which we have termed generally an endotoroidal surface resulting from a grinding of such surface from crossed axes of curvature which may be of different values as in the form shown, the signs of the curvature however being opposite, one positive and one negative.

Figure 3:
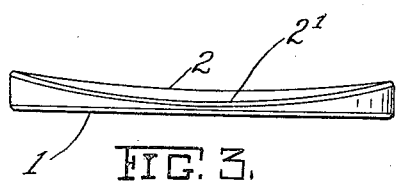
Figs. 3 and 4 are similar views from A and B respectively.

Referring to the drawings as a means of describing such surface it will be noted that the axis 3—3 is an axis of negative value, which if uncombined, would produce a cylindrical concavity of the desired radius. This concavity would, if uninfluenced, be of the form indicated by the marginal line $2^1$ as shown in Fig. 3.

Figure 1:
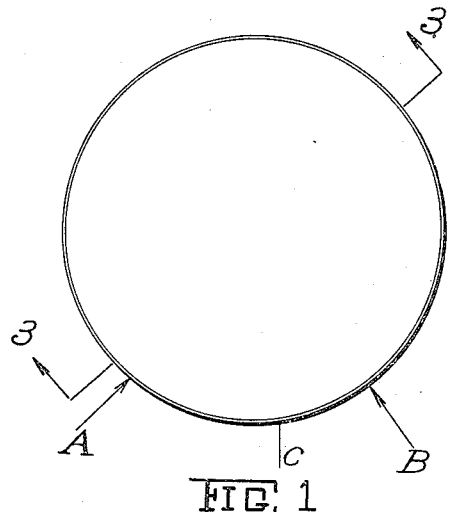
Figure 2:
Fig. 2 is an edge view of the lens viewed from C.
Figure 4:
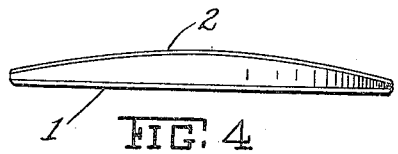
Figure 5:
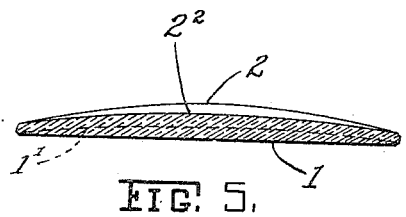
Fig. 5 is a sectional view on the line 3—3 Fig. 1.

This cylindrical concavity is, however, modified by varying the actual tendency of the cylindrical development under the influence of a cylindrical tendency of axis on the line of the arrow B, the same being crossed in relation to the axis 3—3 and of different value, to wit an opposite or positive value tending to develop a convexity as indicated by the edge line 2 and as appears at $2^2$ in Fig. 4 which shows a section on the line 3—3 Fig. 1.

The actual surface thus developed, while incapable of satisfactory illustration in plan will be readily apparent to those skilled in the art from the section shown and the edge views. It is, roughly speaking, in the form shown a general cylindrical concavity in one direction with a characteristic transverse convexity of modification of the general cylindricity of its surface.

As above suggested, the opposite face may be plane as indicated at 1 and this is a very convenient form for many purposes, optical or otherwise. It is furthermore a very convenient stock form as the face 1 may be modified as indicated in broken lines at $1^1$ either to vary the effect of the endotoroid on the opposite face or to combine with it a prismatic, lenticular, or other element for supplemental combination purposes.

Various modifications may obviously be made in the endotoroidal surface by variations of radius curvature, by varying angularity of axes, or by decentering of the axes in relation to the lens and by the modification of the values or the radii either or both of the curvatures, all without departing from the spirit of my invention if within the limits of the appended claims.

What I therefore claim and desire to secure by Letters Patent is:

1. An ophthalmic lens having a refracting surface producing refractions of opposite sign with respect to axes taken at an angle in the same vertical plane.

2. An ophthalmic lens having a composite refracting surface producing the effect of a plus cylinder in one axis, and the effect of a minus cylinder in another axis at an angle thereto.

3. An ophthalmic lens having in a single surface crossed cylindrical refractions of opposite signs.

4. An ophthalmic lens having in a single surface crossed decentered cylindrical refractions of opposite signs.

5. An ophthalmic lens having one face a plane surface and the other face having a surface of concavo convex cylindricity developed from crossed axes.

6. An ophthalmic lens having a surface of concavo convex cylindricity developed from crossed axes.

7. An optical element having an operative surface area of concavo convex cylindricity developed from crossed axes.

8. As a new article of manufacture a plano-endotoroidal lens.

9. As a new article of manufacture an optical element having an endotoroidal surface.

10. As a new article of manufacture a lens having one face formed as an endotoroidal surface and having the opposite surface formed with a different surface.

In testimony whereof I affix my signature in presence of two witnesses.

LOUIS BELL.

Witnesses:
MARY P. WOTHERSPOON,
MARION F. WEISS.